United States Patent [19]

Littrell

[11] Patent Number: 5,025,999
[45] Date of Patent: Jun. 25, 1991

[54] COIL WINDING FORM APPARATUS

[76] Inventor: Chester G. Littrell, 1106 Kees Rd., Lexington, Ky. 40505

[21] Appl. No.: 482,855

[22] Filed: Feb. 22, 1990

[51] Int. Cl.⁵ .................... B65H 75/22; B65H 75/24
[52] U.S. Cl. ................................................ 242/110.3
[58] Field of Search ...................... 242/110.3, 116, 110

[56] References Cited

U.S. PATENT DOCUMENTS

| | | | |
|---|---|---|---|
| 555,516 | 3/1896 | Knox | 242/110.3 |
| 701,317 | 6/1902 | English | 242/110.3 |
| 948,207 | 2/1910 | Coon | 242/110.3 |
| 1,764,125 | 6/1930 | Spoor | 242/110.3 |
| 2,170,764 | 8/1939 | Penman | 242/110 |
| 2,370,868 | 3/1945 | Luebke . | |
| 3,635,260 | 1/1972 | Olson | 242/110.3 |
| 4,221,347 | 9/1980 | Hill | 242/115 X |
| 4,844,346 | 7/1989 | Maraman | 242/129 |

Primary Examiner—Katherine Matecki
Attorney, Agent, or Firm—King & Schickli

[57] ABSTRACT

An apparatus for forming coil windings includes a support rod and a pair of flanges that may be mounted in a selected position along the support rod. A plurality of pivotal arms cooperatively engage the flanges. Coil forming guide rods are received in brackets mounted in sliding engagement in an elongated slot extending in each arm. A measuring gauge is provided to set the guide rods in the desired position for producing a particular size winding. A series of clamps are then tightened to positively hold the arms and brackets in position.

14 Claims, 3 Drawing Sheets

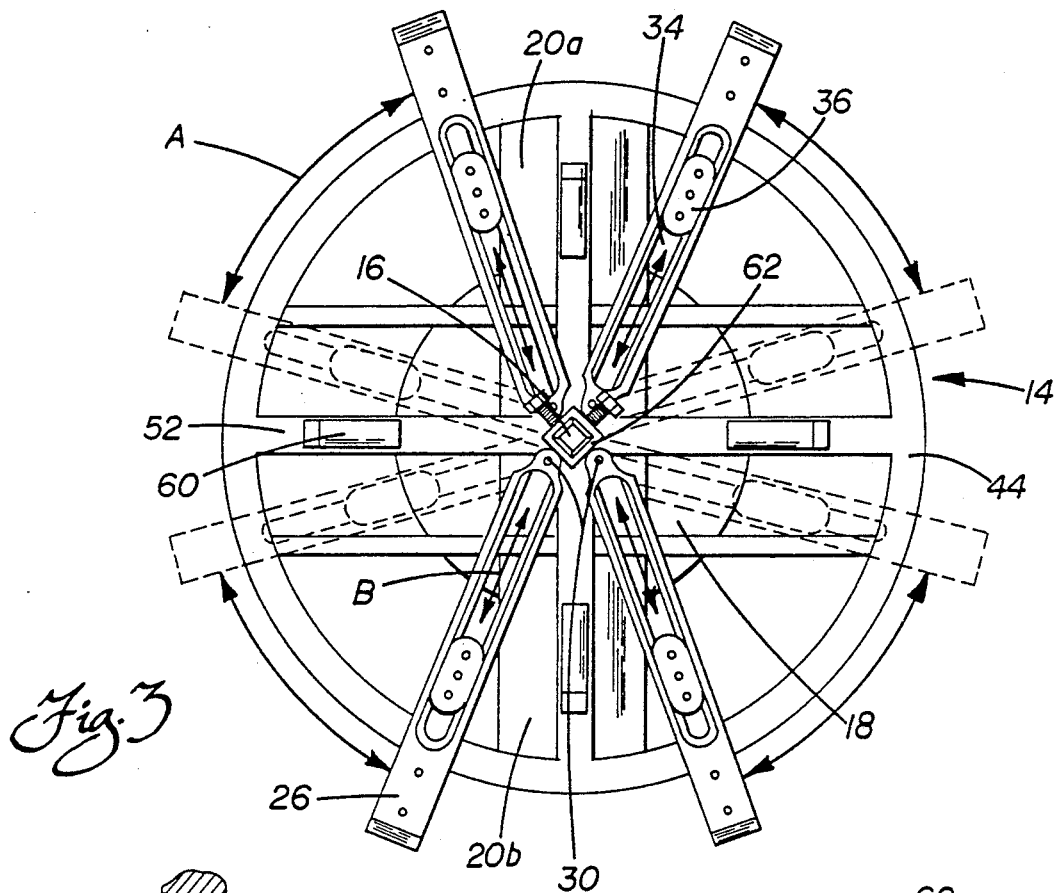

COIL WINDING FORM APPARATUS

TECHNICAL FIELD

The present invention relates generally to the preparation of a coil winding for use in an electric motor or the like and, more particularly, to a method and apparatus for more easily, efficiently and accurately forming a coil winding.

BACKGROUND OF THE INVENTION

Electric motors play an integral part in numerous industrial applications. They are essential to the operation of a range of devices from common home appliances and air conditioning systems to large manufacturing machines. The setting in which an electric motor is used defines its particular specifications. It can be appreciated that, power output requirements vary from application to application and thus, motors are built in a variety of sizes. An electric motor includes electric components and magnetic components that cooperatively interact to provide the desired operation for the motor. Coils typically formed by an electrical conductor, such as copper wire, are integral electrical structures of the motor. They are tightly wound around poles of the magnetic components of the motor and when energized create a proper magnetic flux to influence the proper operation of the motor. Since motors come in a variety of sizes, according to desired driving force, it follows that coil windings are produced in a wide variety of dimensions, each particular winding sized according to the requirements of the particular motor into which it is placed. Presently, many windings are formed on an assembly designed only to wind a coil of that specific unique size. More particularly, many coil winding form assemblies are non-adjustable and accordingly are only used to form one size winding. This necessarily requires the motor manufacturer to stock a plurality of different sized coil winding form apparatus in order to provide different sizes of coil windings.

It can also be appreciated that a manufacturing facility may utilize many different size motors to perform different functions. Many of these facilities have an in-house staff to maintain and repair motors as necessary. It is sometimes necessary during the repair operation to replace damaged or faulty windings in each of a number of different size motors. It is obviously cumbersome and inconvenient to require the stocking of one coil winding form assembly for each different size motor that may be used in the manufacturing facility. Making a new coil winding form apparatus from construction materials each time one is required is also a labor intensive and consequently expensive proposition to be avoided if possible.

Accordingly, there is a need for an improved coil winding form apparatus that is adjustable so that a single apparatus may be conveniently utilized to accurately form different size windings. The improved apparatus would advantageously provide an efficient means for measuring the size coil to be wound. The apparatus would easily cooperate with a standard winding machine. The apparatus would easily adjust to the proper size winding required and provide sufficient strength and support during the forming of the winding. The improved apparatus would also reduce costs for motor manufacturers and repair facilities by obviating the need for multiple assemblies.

SUMMARY OF THE INVENTION

It is therefore a primary object of the present invention to provide a readily adjustable coil winding form apparatus that is capable of forming coil windings of a variety of length, width and height dimensions.

It is still another object of the present invention to provide a coil winding form apparatus including a gauge for accurately measuring the dimensions of the winding needed to be formed.

Still another object of the present invention is to provide a coil winding form apparatus capable of adjustment to form a winding of the appropriate size based on measurements provided by a cooperating gauge.

An additional object of the present invention is to provide a coil winding form apparatus that offers the strength and support required during the forming operation.

It is a further object of the present invention to provide a coil winding form apparatus having end flanges that are adjustable in spaced relation so as to allow a winding of desired height to be formed.

Yet another object of the present invention is to provide a coil winding form apparatus adapted to easily cooperate with a standard winding machine.

Still a further object is to provide a measuring gauge particularly adapted for utilization in accurately setting a coil winding apparatus to produce a coil of desired dimensions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an adjustable coil winding form apparatus is provided. The apparatus is adapted to form coil windings to be used in electric motors or the like. The universal adjustability of the apparatus advantageously obviates the need for motor manufacturers and repair facilities to have a large number of coil winding form assemblies, each capable of forming a winding of only one unique size.

The coil winding form apparatus includes an assembly with two end flanges positioned in variable spaced relation on a support rod. The support rod is fixed to a base that is attachable to an appropriate device such as a winding machine that rotates the apparatus during the forming operation. The support rod is fixed to the base and one of the flanges is mounted in fixed position on the support rod adjacent the base. There is further provided reinforcing attachment between the base and the fixed flange. Accordingly, the base, support rod and fixed flange form an integral foundation to the structure of the present invention.

The second of the flanges, which is removable from the assembly, is adjustable in the axial direction along the support rod. Thus, the flanges may be placed in variable spaced relation with respect to each other so as to allow the forming of a coil winding having any of a variety of heights. The axial adjustment is facilitated by a stop that is slidable axially along the support rod.

The flanges in the preferred embodiment are substantially circular in shape. The circumference of the flanges is defined by an outer peripheral circular margin that is preferably supported by a series of equally spaced spokes extending radially between a position adjacent the support rod and the outer peripheral margin. In the preferred embodiment, there are four equally spaced spokes. Accordingly, the spokes define equal quadrants in each flange.

According to another aspect of the invention, a plurality of arms are attached to each flange and pivotally mounted adjacent the support rod. In the preferred embodiment, each flange has four arms pivotally mounted thereto. The arms extend radially outwardly from adjacent the support rod and are adjustably clamped to the outer peripheral circular margin of each flange. Each arm is positioned to be pivotally displaceable within a quadrant of the flange defined between the spokes. Advantageously, the range of pivotal displacement allows for travel across substantially the full extent of the quadrant. Ribs are attached to the spokes of each flange to align the coil winding during forming and to limit the pivotal displacement of each arm to only one quadrant of the flange.

In accordance with a further important aspect of the invention, each arm is formed with an elongated slot therein. The slots in the arms on the adjustable flange each receive a bracket that cooperatively mates with and secures a corresponding coil guide rod. The coil guide rods and their associated brackets are radially adjustable due to their sliding engagement in the longitudinal slots of the respective arms. Thus, it should be appreciated that with the appropriate angular adjustment of the pivotal arms within their respective flange quadrants and the additional radial adjustment of the coil guide rods along the slots in the arms, a coil winding having any of a variety of length/width dimensions may be formed with the present invention. Further, a coil winding having any of a variety of height dimensions may be formed with the proper adjustment of the stop on the support rod to place the flanges in the proper spacial position relative to each other.

According to a further aspect of the invention, a measuring gauge is provided to assist in the proper positioning of the coil guide rods to allow a coil of the required dimensions to be wound. The gauge includes a primary measuring bar and a substantially perpendicular secondary measuring bar mounted in sliding engagement in the primary measuring bar. Both the primary and secondary measuring bars may each be provided with appropriate measuring indicia for convenience. As will be explained in greater detail below, the desired length of a winding to be wound is set by displacing the secondary measuring bar to a selected position along the primary measuring bar and clamping it in position.

As a further aspect of the invention, the secondary measuring bar includes spacers mounted in sliding engagement thereon. As also explained in greater detail below, these spacers are displaced along the secondary measuring bar to selected positions to set the desired width of the winding to be wound.

The measuring gauge is attached to the support rod and base of the apparatus to set the coil guide rods in the desired position for producing a winding of a given length and width. More particularly, the primary measuring bar has a pin integrally attached to its proximal end. The pin is received in one of a pair of cooperating notches on opposing sides of the support rod. The primary measuring bar further includes a mounting plate formed integrally with and extending at an oblique angle downwardly from its distal end. The mounting plate has a plurality of holes that allow securing screws to pass through and threadably engage cooperating holes in an end face on the base. When the gauge is in position for setting the guide rods, securing screws fasten the mounting plate to the base and the pin securely engages the appropriate notch in the support rod. Thus, the measuring gauge is firmly and securely held in proper orientation to allow accurate positioning of the coil guide rods.

In operation, the adjustable flange is loosened from attachment to the support rod and removed to allow proper positioning of the coil guide rods to take place. The clamps securing the pivotal arms to the outer circular peripheral margin of the flanges are loosened to allow free displacement of each arm within its respective flange quadrant. The holders of the coil guide rods are also loosened to facilitate free radial sliding of the rods along the elongated slots in the arms.

After determining the dimensional requirements of the coil to be wound, the secondary measuring bar is displaced along the primary measuring bar and then clamped in proper position to provide one desired planar dimension. Similarly, the spacers are displaced along the secondary measuring bar and then clamped in proper position to provide the other desired planar dimension. Then the height dimension is set on the coil winding form assembly by securing the stop to the support rod the appropriate distance from the fixed flange. This provides the appropriate spaced relation between the two flanges when in forming position.

The measuring gauge is then properly secured to one side of the support rod and the base in the coil guide rod setting position. Two pivotal arms in adjacent quadrants are then manipulated to the appropriate angular positions and the guide rod holders are displaced along the elongated slots in the arms to properly position the two associated coil guide rods against a finger on the spacers. The guide rod holders are then secured against further movement in the elongated slot and the arms are firmly clamped to the outer peripheral circular margin to securely position the coil guide rods against movement. The gauge is then disengaged and resecured on the opposite side of the support rod to allow the same procedure to take place with respect to the other two coil guide rods. The gauge is then removed and the removable flange is repositioned on the assembly against the stop.

Prior to securing the removable flange on the assembly, course adjustments are made to its pivotal arms to place them in approximate coincident relation with the arms of the fixed flange. The brackets slidable in the slots of the arms of the removable flange are placed in approximate position to receive the coil guide rods when in operative position. The adjustable flange is then placed onto the support rod. As this is done, Fine adjustments are made to the arms and brackets of the removable flange to allow each coil guide rod to ultimately be properly received by each associated bracket on the removable flange. The removable flange is then displaced down the support rod until it rests against the stop setting the height dimension of the coil. The flange is also clamped in position. The brackets are then secured in position and the arms of the adjustable flange are firmly clamped to the outer peripheral circular margin of the flange.

Following a final check to ensure all movable parts are firmly secured, the assembly is ready for the forming operation. The assembly is then placed on the winding machine. The coil wire is fed from its support reel and manually wound several turns around the coil forming rods. The winding machine then automatically completes the forming of the coil winding.

Thus, a coil winding form apparatus that is adjustable to allow a variety of sizes of coil windings to be formed is advantageously provided. The cooperating gauge allows the accurate positioning of the coil guide rods through their radial adjustment along the elongated slots in the pivotal arms and the angular adjustment of the pivotal arms in their associated quadrants. The apparatus operates efficiently to obviate the need for numerous coil winding form assemblies that are each capable of forming only one size coil winding.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a top view with the removable flange removed and showing the arms of the fixed flange in full line and phantom similarly as in FIG. 2;

FIG. 4 is a partial perspective view of the measuring gauge of the coil winding form apparatus in fixed position for setting the coil guide rods;

Reference will now be made in detail to the present preferred embodiment of the invention, an example of which is illustrated in the accompanying drawing.

DETAILED DESCRIPTION OF THE INVENTION

Figure 1:
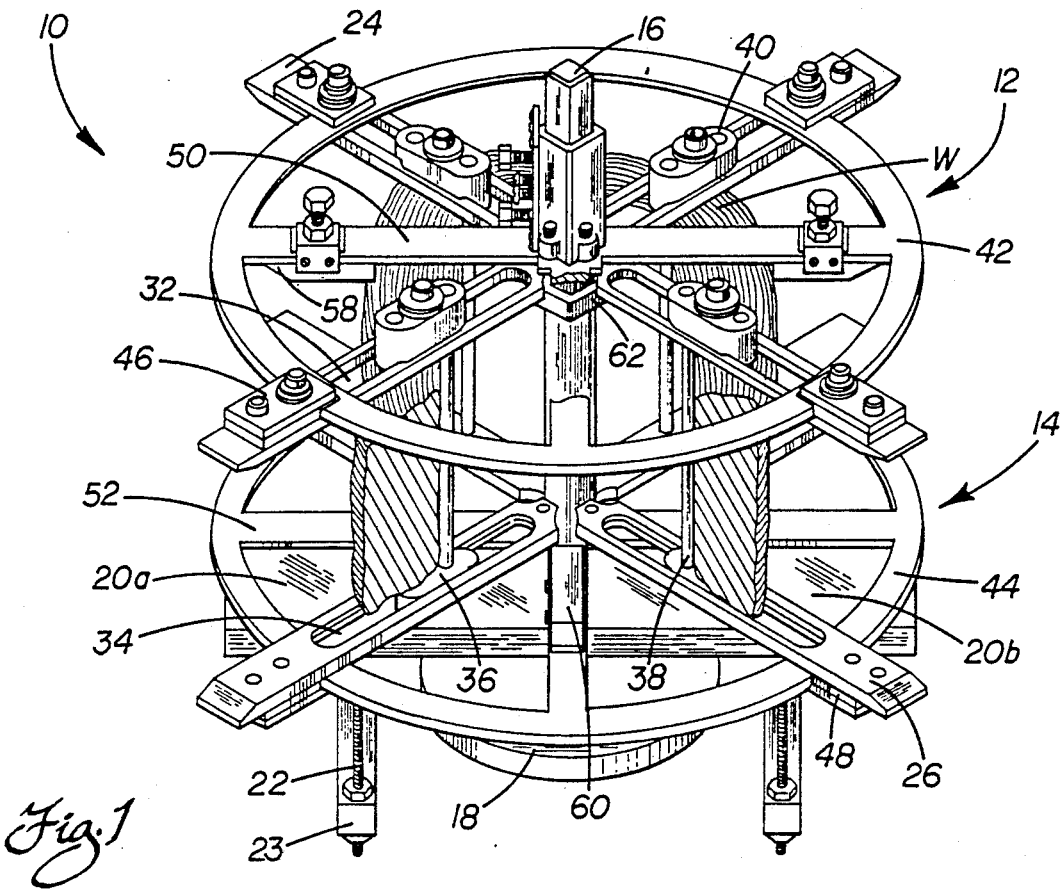
FIG. 1 is a perspective view showing the components of the coil winding form assembly in operative position with a coil winding formed thereon and partially broken away.

Reference is now made to the drawing and particularly to FIG. 1 showing a coil W wound on the coil winding form assembly 10 of the present invention. The assembly 10 includes a pair of flanges 12, 14 that are placed in variable relative axial position with respect to each other on a support rod 16. In the preferred embodiment, the flange 14 is fixed to the support rod 16 while the flange 12 is removable and axially adjustable along the rod 16 to define a relative spaced relation to the fixed flange 14 when in operative position. It can be appreciated, however, that the fixed flange 14 may be separable from the rod 16 to allow easy storage and transportation of the assembly 10.

Figure 6:
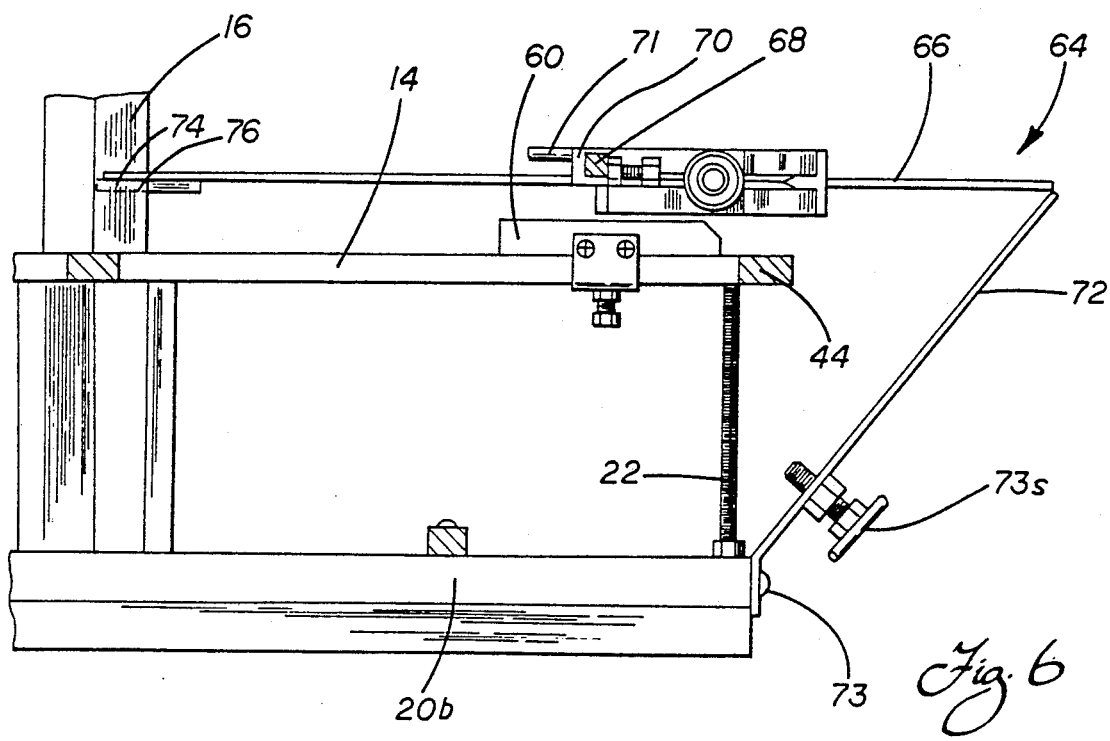
FIG. 6 is a partial side view showing the measuring gauge secured in fixed position to properly position the coil guide rods.

The support rod 16 is fixed to a base 18 that includes opposed support legs 20a, 20b. Flange struts 22 are attached to the support legs 20a, 20b (see FIGS. 4 and 6) and provide additional support to the fixed flange 14. Additional struts 22 are attached to opposing ends of strut bars 23 to provide further support for the fixed flange 14. Accordingly, the fixed flange 14, the support rod 16 and the base 18 with attached struts 22 and strut bars 23 form an integral foundation for the assembly 10. As with the fixed flange 14, the other foundation components may be separable from the assembly 10 to facilitate transportation and storage if desired.

Figure 2:
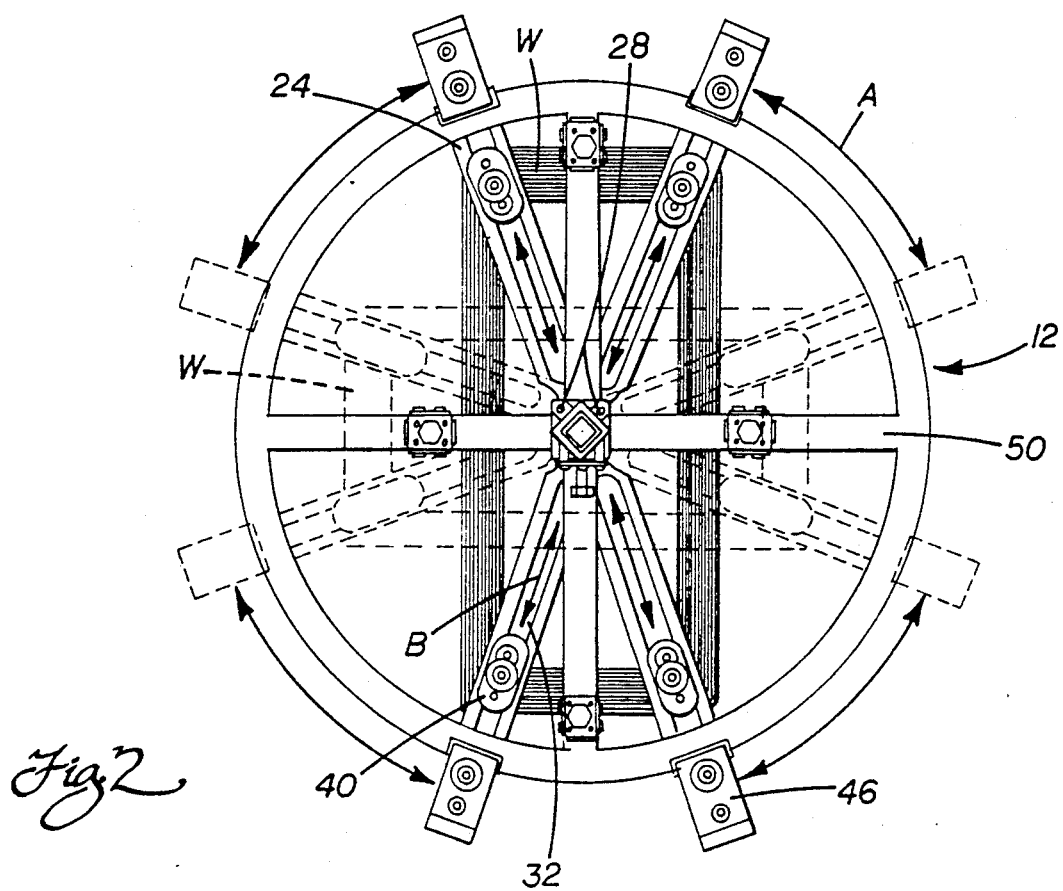
FIG. 2 is a top view of the coil winding form assembly showing the arms of the removable flange in full line and in phantom to emphasize the angular adjustability and further showing a coil winding thereon in full line and phantom.
Figure 5:
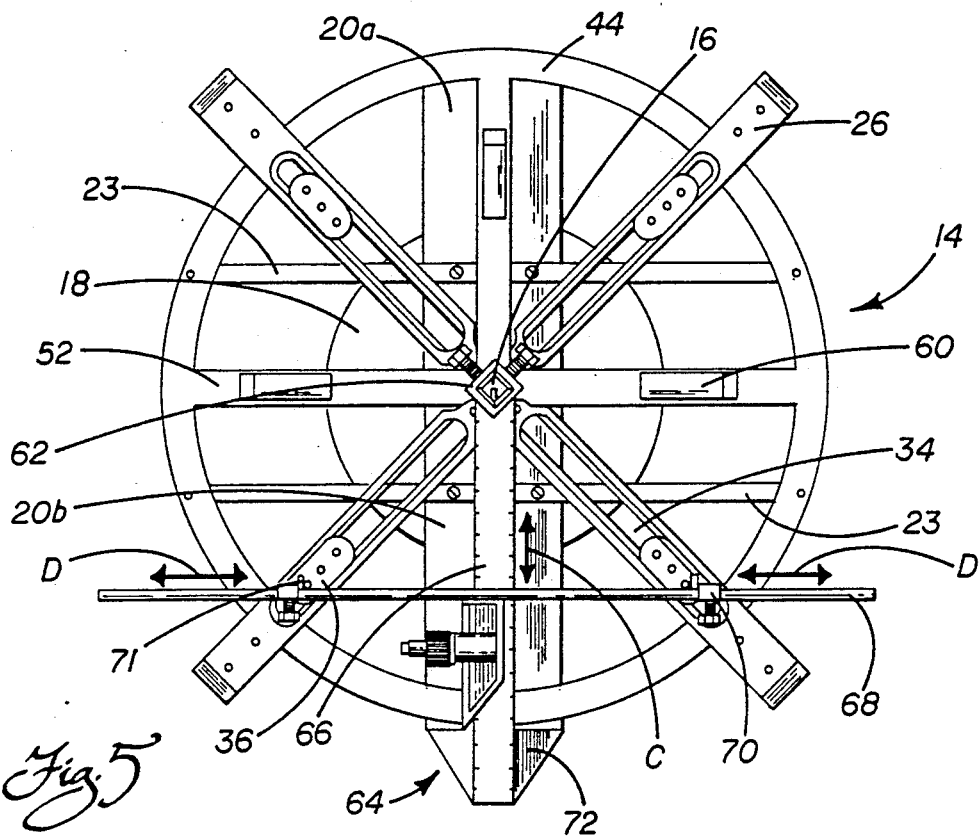
FIG. 5 is a top view similar to FIG. 3 but with the measuring gauge of the coil winding form apparatus in position for properly positioning the coil forming guide rods.

The flanges 12, 14 each support a plurality of arms pivotally mounted adjacent the support rod 16. The pivotal arms 24 on the removable flange are best shown in FIG. 2. The pivotal arms 26 on the fixed flange are best shown in FIGS. 3 and 5. The arms 24 pivot about pivot pins 28 and the arms 26 pivot about pivot pins 30.

Each of the pivotal arms 24 is formed with an elongated slot 32 and likewise each of the pivotal arms 26 is formed with a similar elongated slot 34. Each slot 34 supports a coil guide rod bracket or holder 36 (see FIGS. 3 and 5) that is slidable along the entire extent of the slot 34. Each holder 36 supports a coil guide rod 38 that may be formed integral therewith as best shown in FIG. 1. It can be appreciated that when securely set in the forming position, the guide rods 38 in the preferred embodiment define four specific perimeter points around which the coil winding is formed.

The elongated slots 32 in the pivotal arms 24 support guide rod brackets 40. Each bracket 40 is slidable along the entire extent of its associated slot 32. The guide rod brackets 40 receive and secure the guide rods 38 when the assembly 10 is in the proper coil forming position. It can be appreciated that when in this position, the associated arms 24, 26 are substantially coincident with each other in the vertical plane and the holders 36 and brackets 40 extend substantially the same radial distance from the support rod 16 in their associated elongated slots 34, 32. In this manner, the coil winding W formed with the present invention is substantially symmetrical about the axes bisecting the angle between adjacent guide rods 38.

In the preferred embodiment, the flanges 12, 14 are substantially circular in shape. The flanges 12, 14 also each have a substantially equal outer dimension defined by respective outer peripheral circular margins 42, 44. The margins 42, 44 provide sites for securing means for the respective arms 24, 26. More particularly, each arm 24, 26 has an associated clamp 46, 48, respectively, attached thereto that is tightened by any commonly known means. Accordingly, when the arms 24, 26 have been properly positioned for the coil forming operation, the clamps 46, 48 are secured to the respective margins 42, 44 to prevent any arm movement as the coil winding W is formed.

In a further aspect of the invention, each of the flanges 12, 14 are further provided with equally spaced spokes 50, 52 extending outwardly from adjacent the support rod 16 and providing support for the respective margins 42, 44. In the preferred embodiment, each flange 12, 14 has four spokes 50, 52 equally spaced from each other and thus the spokes 50, 52 define four equal quadrants. Each of the spokes 50, 52 has attached thereto an associated rib 58, 60. The ribs 58, 60 serve two functions. They are radially adjustable along the spokes 50, 52 to properly align the coil winding W between the guide rods 38. More particularly, the ribs 58, 60 are positioned to engage the outer surface of the coil winding W as it is formed between the rod to facilitate the forming of a winding W with straight sides. The positioning of the ribs 58, 60 along the spokes 50, 52 also naturally acts to limit the motion of the arms 24, 26 to their associated quadrants.

Accordingly, as is best shown in FIGS. 2 and 3, when the clamps 46, 48 are loosened, each arm 24, 26 is capable of a range of angular travel described by action arrows A. This action cooperates with the radial adjustment capability of the holders 36 with the guide rods 38 as depicted by action arrows B to allow the coil guide rods 38 to be positioned in a substantially infinite variety of positions to allow the assembly 10 to form a winding W having one of a variety of sizes, i.e. length/width dimensions. It can be appreciated with reference to FIG. 2 that the length/width dimensions of a rectangularly shaped coil winding W may be formed along either the vertical or horizontal axis of the assembly 10 with respect to the spoke 50, 52 orientation as viewed from above.

According to a further aspect of the invention, the assembly 10 is provided with a stop 62 that is shown partially hidden in FIG. 1. The stop 62 is slidable axially along the support rod 16 and may be secured thereto at any number of positions by any known securing means such as a bolt. The stop 62 is properly secured to the support rod 16 to facilitate proper relative spacing between the flanges 12, 14 to produce a winding W of the proper height dimension. It is seen in FIG. 1 that when in operable position, the flange 12 rests on the stop 62.

The coil winding form apparatus 10 is also provided with a measuring gauge 64 that assists in the proper placement of the guide rods 38 for the coil forming operation. The measuring gauge 64 includes a primary measuring bar 66. A secondary measuring bar 68 is slidably mounted on and is in substantial perpendicular orientation to the primary measuring bar 66. The primary bar 66 and the secondary bar 68 may each be provided with appropriate measuring indicia for operator convenience.

The secondary measuring bar 68 is adapted to slide along the length of the primary measuring bar 66 as described by action arrow C in FIG. 5. It can be appreciated that the range of travel of the secondary measuring bar 68 along the primary measuring bar 66 accomodates the range of travel of the holders 36 with guide rods 38 in their associated slots 34 to allow each guide rod 38 to be properly set at all possible positions within its associated quadrant. The secondary measuring bar 68 is secured to the primary measuring bar 66 when set in the proper position by a clamp or any other known means of securement.

In a further aspect of the invention, a pair of spacers 70 are adjustably mounted on the secondary measuring bar 68. The spacers 70 are slidable along the secondary measuring bar 68 as shown by action arrows D in FIG. 5. The spacers 70 have fingers 71 formed integrally therewith to positively engage the guide rods 38 as the latter are being positioned for the coil forming operation. It can be appreciated that the distance between the spacers 70 sets the dimension of the winding W in the direction perpendicular to that set according to the radial positioning of the holders 36 with the coil guide rods 38 along the slots 34 in the arms 26.

The gauge 64 is thus used to properly position the guide rods 38 in their proper coil forming position according to the respective positions of the secondary measuring bar 68 on the primary measuring bar 66 and the spacers 70 on the secondary measuring bar 68. The dimensions of the coil winding W may be provided to custom order utilizing the measuring indicia on the primary and secondary measuring bars 66, 68, respectively. Alternatively, the gauge 64 itself may be utilized to measure the appropriate length, width and height and the proper settings established according to the manual measurements.

The measuring gauge 64 further includes a mounting plate 72 that extends downwardly and at an oblique angle inwardly from the distal end of the primary measuring bar 66. The mounting plate 72 has a plurality of holes that coincide with holes bored into end faces of the support legs 20a, 20b. Securing screws 73 (see FIG. 4) are threaded through the holes in the plate 72 into the bores in the operable support leg 20a or 20b to assist in securing the gauge 64 to the assembly 10. The plate 72 may also hold a spare securing screw 73S.

The gauge 64 further includes a pin 74 that is received in one of a pair of notches 76 formed in opposite sides of the support rod 16. After the gauge 64 has been properly set for the coil forming operation, it is secured to the assembly 10 by the cooperating engagement of the pin 74 in its respective notch 76 and the securement of the plate 72 to the operable support leg 20a or 20b by the screws 73. Accordingly, the measuring gauge 64 is securely positioned on the assembly 10 to allow the precise and secure positioning of the guide rods 38 through the cooperating angular adjustment of the arms 26 and the radial adjustment of the holders 36. This cooperating adjustment allows the guide rods 38 to be firmly positioned on inner facing corners defined by the intersection of the fingers 71 of the spacers 70 and the secondary measuring bar 68 (note particularly FIG. 4).

In operation, the assembly 10 is first separated by removing the removable flange 12 to allow access to the fixed flange 14. To do this, the clamps 46, 48 on both flanges 12, 14 are loosened to allow free angular movement of the arms 24, 26 along the outer peripheral circular margins 40, 42. Additionally, the guide rod holders 36 and brackets 40 are loosened to allow free sliding movement along the associated elongated slots 34, 32. Also, the ribs 58, 60 are loosened and pushed along the spokes 50, 52 to adjacent the outer peripheral circular margins 42, 44 of the flanges 12, 14.

The required winding dimensions are determined either with reference to a prior custom order or by making the appropriate measurements using the dimension indicia on the measuring gauge 64 or with a separate measuring device. The measuring gauge 64 is then adjusted to conform to the appropriate length/width dimensions for the coil winding. It can be appreciated that within the overall dimensional capability of the assembly 10, any side dimension (length or width) may be formed between any two adjacent guide rods 38 (see FIG. 2). It can be also appreciated, however, that one side dimension will be completely defined by the distance between spacers 70 on the secondary measuring bar 68 while one-half of the other side dimension will be defined along the primary measuring bar 66 between its attachment site at the support rod 16 along the radial direction to the primary measuring bar 68.

After determining the appropriate length/width dimensions, the gauge 64 is properly adjusted in accordance with the above-described procedure. The secondary measuring bar 68 is displaced along and tightened on the primary measuring bar 66 and the spacers 70 are displaced along and tightened on the secondary measuring bar 68. The measuring gauge 64 is now ready to engage the assembly 10 to properly position the guide rods 38 for the forming operation.

The measuring gauge 64 is attached to the assembly 10 by inserting the pin 74 into one of the opposed notches 76 in the support rod 16 and securing the mounting plate 72 to one of the opposed support legs 20a or 20b. The gauge 64 is thus in position to securely and accurately position the two guide rods 38 on the arms 26 over whose quadrants the secondary measuring bar 68 now lies. Cooperating adjustments involving the angular pivoting of the arms 26 and the radial sliding of the guide rod holders 36 is accomplished to properly position the guide rods 38 securely against the respective corners of the measuring gauge 64 defined by the intersection of the fingers 71 on the spacers 70 with the secondary measuring bar 68 (see FIG. 4). The clamps 48 and the holders 36 are then tightened to firmly position the now-set guide rods 38 in place. The measuring gauge 64 is then disengaged from the assembly 10 and reattached to the other leg 20a or 20b of the opposite side of the assembly 10. The same procedure is then used to properly position the remaining two guide rods 38.

With the guide rods 38 now tightened in position, the removable flange 12 may now be positioned on the assembly 10. The stop 62 is properly positioned on the support rod 16 and secured thereto to define the proper relative distance between opposing flanges 12, 14 to allow the formation of a coil winding W having the appropriate height. Prior to positioning the flange 12 on the support rod 16, course adjustments are made to the arms 24 to place them in substantial vertical coincidence with the associated arms 26 on the fixed flange 14. Likewise, course adjustments are made to the brackets 40 to substantially place them in position to properly receive the guide rods 38. Upon initial contact between the flange 12 and the support rod 16, fine adjustments are made to the arms 24 and brackets 40 to allow positive and secure engagement between the brackets 40 and the guide rods 38. The flange 12 can then freely slide down the support rod 16. When the flange 12 comes to rest on the stop 62, it is secured to the support rod 16 by a bolt or other clamping mechanism. The clamps 46 and the brackets 40 are also tightened to complete the positive and secure positioning of the guide rods prior to initiating the coil forming operation.

Following a final check to ensure all movable parts of the assembly 10 are firmly secured, the assembly 10 is mounted on a winding machine by means of the base 18. After several turns of wire have been carefully fed around the guide rods 38, the ribs 58, 60 are pushed inwardly on and properly secured to the spokes 50, 52 to support the sides of the winding W in proper alignment between adjacent guide rods 38. The winding machine is then actuated to complete the formation of the coil winding W.

When formation of the coil winding W is completed, it may be easily removed from the apparatus of the present invention. More particularly, the flange 12 is removed from the support rod 16. If necessary, the clamps 46 and 48 as well as the holders 36 and brackets 40 are loosened to allow the guide rods 38 to be moved away from the coil winding W. In this way, clearance may be provided to allow the free removal of the finished coil winding W from the apparatus 10.

In summary, numerous benefits are obtained by the use of the present invention. The invention includes a coil winding form assembly 10 that is properly adjusted for the forming operation with the assistance of a measuring gauge 64. The gauge 64 includes a primary measuring bar 66 and a secondary measuring bar 68 that cooperate to allow the coil forming guide rods 38 to be properly positioned for the forming operation. A variety of sizes of windings W may be formed due to the advantageous adjustment capability of the assembly 10. More particularly, the pivotable arms 24, 26 are angularly adjustable within equally spaced quadrants in the assembly 10. The guide rod holders 36 and guide rod brackets 40 are radially slidable in the elongated slots 34, 32 to enhance the adjustment capability of the assembly 10. Accordingly, the present invention provides the capability of forming a wide variety of different sized windings W and thus obviates the need for a plurality of individual coil winding form assemblies each capable of producing only one size winding coil.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A coil winding form apparatus, comprising:
a support rod;
a first flange;
a second flange;
means for mounting said first and second flanges in a selected position on said support rod;
a first series of arms pivotally mounted to said first flange adjacent said support rod;
a second series of arms pivotally mounted to said second flange adjacent said support rod;
a series of coil forming guide rods extending between said first and second series of arms;
bracket means for engaging said guide rods received in sliding engagement in elongated slots in said first and second series of arms; and
means for clamping said first and second series of arms and said bracket means in a selected position so as to allow the forming of a wire coil of desired dimensions.

2. The apparatus set forth in claim 1, further including a base for receiving said support rod, said base including outwardly opposed support legs.

3. The apparatus set forth in claim 2, wherein said mounting means includes stop means slidable on said support rod for facilitating the relative vertical positioning of said flanges with respect to each other.

4. The apparatus set forth in claim 2, further including a gauge adapted for releasably attaching to said support rod.

5. The apparatus set forth in claim 4, wherein said gauge includes means for releasably attaching to said support legs.

6. The apparatus set forth in claim 5, wherein said gauge includes a primary measuring bar that extends radially outwardly from said support rod when said gauge is connected thereto and a secondary measuring bar that extends substantially perpendicular to said primary measuring bar.

7. The apparatus set forth in claim 6, further including means for mounting said secondary measuring bar in sliding engagement with said primary measuring bar.

8. The apparatus set forth in claim 7, further including spacer means mounted in sliding engagement on said secondary measuring bar for determining the desired position of the coil forming guide rods.

9. The apparatus set forth in claim 8, wherein said spacer means include securing means for positively securing said spacer means in a set position along said secondary measuring bar.

10. The apparatus set forth in claim 1, further including a gauge for setting the position of said coil forming guide rods.

11. The apparatus set forth in claim 1, wherein said first and second flange means are substantially circular.

12. The apparatus set forth in claim 11, wherein each of said first series of arms includes a means for engaging an outer peripheral circular margin of said first flange and each of said second series of arms includes a means for engaging an outer peripheral circular margin of said second flange.

13. The apparatus set forth in claim 12, wherein a series of four equally spaced spokes support the outer peripheral circular margin of each of said first and second flanges, said spokes defining equal quadrants therebetween in each flange.

14. The apparatus set forth in claim 13, wherein one of said arms is received for pivotal displacement across substantially the full extent of each quadrant.

* * * * *